United States Patent
Martin et al.

(10) Patent No.: US 11,873,562 B2
(45) Date of Patent: Jan. 16, 2024

(54) COATING DEVICE AND METHOD FOR METAL-COATING OF WORKPIECES

(71) Applicant: STURM MASCHINEN—& ANLAGENBAU GMBH, Salching (DE)

(72) Inventors: Carlos Martin, Deggendorf (DE); Roland Baier, Bad Abbach (DE)

(73) Assignee: STURM MASCHINEN—& ANLAGENBAU GMBH, Salching (DE)

( * ) Notice: Subject to any disclaimer, the term of this patent is extended or adjusted under 35 U.S.C. 154(b) by 413 days.

(21) Appl. No.: 17/014,633

(22) Filed: Sep. 8, 2020

(65) Prior Publication Data

US 2021/0069787 A1     Mar. 11, 2021

(30) Foreign Application Priority Data

Sep. 9, 2019  (EP) .................................... 19196156
Sep. 27, 2019 (EP) .................................... 19200051
(Continued)

(51) Int. Cl.
*C23C 24/10*      (2006.01)
*B23K 26/342*    (2014.01)
(Continued)

(52) U.S. Cl.
CPC ............ *C23C 24/10* (2013.01); *B22F 3/1007* (2013.01); *B22F 10/28* (2021.01); *B22F 12/224* (2021.01);
(Continued)

(58) Field of Classification Search
CPC ............ B05B 13/0228; B05B 13/0415; B05B 13/0442; B05B 14/10; B05B 14/30;
(Continued)

(56) References Cited

U.S. PATENT DOCUMENTS 4,237,364 A  *  12/1980  Lemelson .............. B23K 26/04
                                                        219/121.78
6,235,634 B1      5/2001  White et al.
(Continued)

FOREIGN PATENT DOCUMENTS

CN        1083127 A      3/1994
CN      104388929 A      3/2015
(Continued)

OTHER PUBLICATIONS

An Office Action mailed by the Indian Patent Office dated Sep. 24, 2021, which corresponds to Indian Patent Application No. 202034036814 and is related to U.S. Appl. No. 17/014,633 with English language translation.
(Continued)

*Primary Examiner* — Dana Ross
*Assistant Examiner* — Joseph W Iskra
(74) *Attorney, Agent, or Firm* — Studebaker & Brackett PC

(57) ABSTRACT

The invention relates to a coating device and to a method for metal-coating of workpieces, comprising a housing, which surrounds a working space, a retaining apparatus for retaining at least one workpiece in the working space, at least one deposition apparatus comprising a deposition nozzle for applying a metal powder to a workpiece surface to be coated, and a laser for locally melting the metal powder on the workpiece surface to form a coating, at least one movement apparatus, by means of which the at least one deposition apparatus can be moved relative to the workpiece surface during the coating, at least one air supply and at least one air discharge. According to the invention, it is provided that the air supply is arranged in an upper region of the working space above the workpiece and the air discharge is arranged in a lower region of the working space below the
(Continued)

workpiece. In addition, a additional suction apparatus is provided with at least one suction opening, which is arranged close to the workpiece.

7 Claims, 7 Drawing Sheets

(30) Foreign Application Priority Data

Sep. 27, 2019 (EP) .................................... 19200059
Oct. 7, 2019 (EP) .................................... 19201679

(51) Int. Cl.
| | | |
|---|---|---|
| B23K 26/144 | (2014.01) | |
| B23K 26/00 | (2014.01) | |
| C23C 4/134 | (2016.01) | |
| C23C 4/18 | (2006.01) | |
| C23C 4/123 | (2016.01) | |
| B22F 3/10 | (2006.01) | |
| B22F 10/28 | (2021.01) | |
| B22F 12/00 | (2021.01) | |
| B22F 12/55 | (2021.01) | |
| B33Y 10/00 | (2015.01) | |
| B33Y 30/00 | (2015.01) | |
| B22F 10/00 | (2021.01) | |
| B22F 12/53 | (2021.01) | |
| B22F 12/70 | (2021.01) | |
| B22F 12/86 | (2021.01) | |

(52) U.S. Cl.
CPC .............. *B22F 12/38* (2021.01); *B22F 12/55* (2021.01); *B23K 26/0006* (2013.01); *B23K 26/0093* (2013.01); *B23K 26/144* (2015.10); *B23K 26/342* (2015.10); *C23C 4/123* (2016.01); *C23C 4/134* (2016.01); *C23C 4/18* (2013.01); *B22F 10/00* (2021.01); *B22F 12/53* (2021.01); *B22F 12/70* (2021.01); *B22F 12/86* (2021.01); *B22F 2201/50* (2013.01); *B22F 2202/11* (2013.01); *B33Y 10/00* (2014.12); *B33Y 30/00* (2014.12)

(58) Field of Classification Search
CPC ......... B05B 15/70; B05B 16/20; B05B 16/80; B05B 16/95; B05B 7/228; B22F 10/00; B22F 10/28; B22F 12/224; B22F 12/38; B22F 12/53; B22F 12/55; B22F 12/70; B22F 12/86; B22F 2201/50; B22F 2202/11; B22F 2999/00; B22F 3/003; B22F 3/1007; B22F 3/115; B22F 7/02; B22F 7/08; B23K 26/0006; B23K 26/0093; B23K 26/0823; B23K 26/144; B23K 26/1464; B23K 26/16; B23K 26/34; B23K 26/342; B33Y 10/00; B33Y 30/00; C23C 24/10; C23C 24/103; C23C 24/106; C23C 26/02; C23C 4/00; C23C 4/01; C23C 4/06; C23C 4/12; C23C 4/123; C23C 4/134; C23C 4/18; F16D 65/127; Y02P 10/25
USPC ........................................................ 219/76.1
See application file for complete search history.

(56) References Cited

U.S. PATENT DOCUMENTS

| | | | | |
|---|---|---|---|---|
| 8,882,892 | B2 * | 11/2014 | Hoversten | B05B 14/48 |
| | | | | 95/271 |
| 2006/0228465 | A1 * | 10/2006 | Zurecki | C21D 1/667 |
| | | | | 427/446 |
| 2006/0272909 | A1 | 12/2006 | Fuller et al. | |
| 2008/0087359 | A1 * | 4/2008 | Zurecki | C23C 8/02 |
| | | | | 427/255.28 |
| 2009/0130305 | A1 | 5/2009 | Von Keudell et al. | |
| 2014/0186549 | A1 | 7/2014 | Miyagi et al. | |
| 2017/0349991 | A1 | 12/2017 | Ebenbeck et al. | |

FOREIGN PATENT DOCUMENTS

| | | |
|---|---|---|
| CN | 104928675 A | 9/2015 |
| CN | 105817621 A | 8/2016 |
| CN | 107208245 A | 9/2017 |
| CN | 107604357 A | 1/2018 |
| CN | 107904591 A | 4/2018 |
| DE | 10 2006 046 968 A1 | 4/2008 |
| EP | 0661127 A1 | 7/1995 |
| JP | H06-049656 A | 2/1994 |
| JP | H06-083177 U | 11/1994 |
| JP | H07-185866 A | 7/1995 |
| JP | H10-098216 A | 4/1998 |
| JP | 2006-257459 A | 9/2006 |
| JP | 2010-202939 A | 9/2010 |
| JP | 2018-069266 A | 5/2018 |
| JP | WO2019/030839 A1 | 3/2020 |
| KR | 10-2017-0105513 A | 9/2017 |
| WO | 2009/018841 A1 | 2/2009 |

OTHER PUBLICATIONS

An Office Action mailed by China National Intellectual Property Administration dated Sep. 2, 2022, which corresponds to Chinese Patent Application No. 202010940037.8 and is related to U.S. Appl. No. 17/014,633; with English translation.

An Office Action mailed by the Japanese Patent Office dated Mar. 15, 2022, which corresponds to Japanese Patent Application No. 2020-148723 and is related to U.S. Appl. No. 17/014,633; with English translation.

An Office Action mailed by the Korean Intellectual Property Office dated Nov. 1, 2022, which corresponds to Korean Patent Application No. 10-2020-0113603 and is related to U.S. Appl. No. 17/014,633; with English translation.

An Office Action mailed by the Korean Intellectual Property Office dated Nov. 1, 2022, which corresponds to Korean Patent Application No. 10-2020-0113604 and is related to U.S. Appl. No. 17/014,633; with English translation.

An Office Action mailed by the Korean Intellectual Property Office dated Nov. 1, 2022, which corresponds to Korean Patent Application No. 10-2020-0113605 and is related to U.S. Appl. No. 17/014,633; with English translation.

An Office Action mailed by the Korean Intellectual Property Office dated Jun. 21, 2022, which corresponds to Korean Patent Application No. 10-2020-0113606 and is related to U.S. Appl. No. 17/014,633; with English translation.

An Office Action mailed by China National Intellectual Property Administration dated Nov. 23, 2022, which corresponds to Chinese Patent Application No. 202010848453.5 and is related to U.S. Appl. No. 17/014,633; with English translation.

An Office Action mailed by China National Intellectual Property Administration dated May 30, 2023, which corresponds to Chinese Patent Application No. 202010848453.5 and is related to U.S. Appl. No. 17/014,633; with English translation.

An Office Action mailed by China National Intellectual Property Administration dated Jan. 13, 2023, which corresponds to Chinese Patent Application No. 202010883806.5 and is related to U.S. Appl. No. 17/014,633; with English translation.

An Office Action mailed by China National Intellectual Property Administration dated May 31, 2023, which corresponds to Chinese Patent Application No. 202010940037.8 and is related to U.S. Appl. No. 17/014,633; with English translation.

An Office Action issued by Taiwan Intellectual Property Office dated Apr. 28, 2023, which corresponds to Taiwanese Patent Application No. 109129114 and is related to U.S. Appl. No. 17/014,633; with English translation.

(56) References Cited

OTHER PUBLICATIONS

An Office Action issued by Taiwan Intellectual Property Office dated May 5, 2023, which corresponds to Taiwanese Patent Application No. 109129116 and is related to U.S. Appl. No. 17/014,633; with English translation.

* cited by examiner

COATING DEVICE AND METHOD FOR METAL-COATING OF WORKPIECES

The invention relates to a coating device for metal-coating of workpieces, comprising a housing, which surrounds a working space, a retaining apparatus for retaining at least one workpiece in the working space, at least one deposition apparatus comprising a deposition nozzle for applying a metal powder to a workpiece surface to be coated, and a laser for locally melting the metal powder on the workpiece surface to form a coating, at least one movement apparatus, by means of which the at least one deposition apparatus can be moved relative to the workpiece surface during the coating, at least one air supply and at least one air discharge, according to the preamble of claim 1.

The invention further relates to a method for metal-coating of workpieces, in which at least one workpiece is retained in a housing in a working space by means of a retaining apparatus, a workpiece surface is coated by means of at least one deposition apparatus, a metal powder being applied to a workpiece surface to be coated by means of the deposition nozzle of the at least one deposition apparatus and the applied metal powder being locally melted on the workpiece surface by means of a laser of the at least one deposition apparatus, with a metal coating being formed, the at least one deposition apparatus is moved relative to the workpiece surface during the coating by means of at least one movement apparatus, and air is supplied into the working space via at least one air supply and air is discharged from the working space via at least one air discharge, according to the preamble of claim 12.

Coating devices and methods of this kind for metal-coating of workpieces are known as laser deposition welding. In this process, a powder is applied to a metal workpiece and is locally melted by means of a laser. The molten metal powder forms a coating on the workpiece surface, which coating can be particularly wear-resistant or corrosion-resistant, in particular. The method is carried out in a closed working space of the coating device, with air being conducted into and out again of the working space, in particular for cooling.

The invention is based on the object to provide a coating device and a method for metal-coating of workpieces, by means of which workpieces can be coated particularly efficiently.

According to the invention, the object is solved both by a coating device having the features of claim 1 and by a method having the features of claim 12. Preferred embodiments of the invention are set out in the respectively dependent claims.

The coating device according to the invention is characterised in that the air supply is arranged in an upper region of the working space above the workpiece and the air discharge is arranged in a lower region of the working space below the workpiece, and in that, in addition, a suction apparatus is provided with at least one suction opening, which is arranged close to the workpiece.

A basic concept of the invention can be considered that of not only efficiently cooling the workpiece during the coating, but also ensuring that non-molten metal powder and dust is sufficiently removed from the working space. According to a first aspect of the invention, this is achieved in that the air is supplied towards the workpiece and the air is discharged from the working space away from the workpiece. In particular, the air supply is above the workpiece and the air discharge is below the workpiece. Thus, it can be performed that air flows around the workpiece in a targeted and defined manner.

According to another aspect of the invention, an additional suction apparatus can be provided with at least one suction opening, which is arranged close to the workpiece. The discharge of non-molten metal powder is thus not performed by the normal supply and discharge of air alone, but a suction apparatus is additionally provided, by means of which metal powder and dust are directly removed from the workpiece with high reliability. In this process, gases developing during the coating can also be reliably carried away, which also has a positive effect on the quality of the coating. The guidance of the air and the suction apparatus can each also be provided on their own.

A preferred embodiment of the invention involves the workpiece surface to be coated being arranged horizontally. The workpiece surface being arranged horizontally in particular allows metal powder to be used particularly economically. This powder can be deposited on the workpiece surface such that it initially remains lying on the horizontally directed workpiece surface. In this position, it can be melted by the laser in a targeted manner. Unused metal powder or dust can be carried away by the suction apparatus according to the invention as required, such that the laser can impinge on the surface in a largely unimpeded manner.

According to an alternative arrangement of a coating device according to the invention, it is advantageous for the workpiece surface to be coated to be arranged vertically. In a vertical arrangement, in which the workpiece surface is oriented approximately in the direction of gravitational force, excess metal powder is essentially carried away in a downward direction. This can be assisted by the suction apparatus according to the invention, with excessive quantities of metal powder in particular being prevented from getting into the air discharge. Overall, a very precise coating can be achieved with this arrangement.

According to a development of the invention, particularly efficient coating can be achieved in that at least two deposition apparatuses are arranged in the working space of the housing, which apparatuses are designed to simultaneously apply and melt metal powder. Two or more deposition apparatuses can simultaneously apply and melt a metal powder. A particularly short processing time can thus be achieved.

According to a development of the invention, it is particularly expedient for two deposition apparatuses to be provided, by means of which a coating can be deposited simultaneously on a workpiece. In this process, the one workpiece can be arranged horizontally or vertically. By means of two or more deposition apparatuses which simultaneously coat a workpiece, a particularly short processing time per workpiece can be achieved. In this arrangement, a suction apparatus can be provided with respectively at least one suction opening per deposition apparatus. In this case, the suction opening can in particular be arranged in the vicinity of each deposition apparatus.

Another particularly economical embodiment of the coating device according to the invention involves at least two workpieces being arranged in the working space and each being able to be coated simultaneously by at least respectively one deposition apparatus. In the process, the workpieces can be arranged on separate retaining apparatuses or preferably on a common retaining apparatus, which supports the at least two workpieces together. Here, the retaining apparatus may in particular be arranged on a transport pallet, by means of which the workpieces are transported together into and out of the coating device. By receiving at least two workpieces in one coating device, said device can be utilised particularly effectively, including the required apparatus for supplying the metal powder and for discharging the unused metal powder relative to the suction apparatus.

A particularly advantageous embodiment of the invention can be considered in that the suction apparatus comprises a hollow-body-like housing comprising a receiving opening, in which the at least one workpiece is arranged at least in part during the coating. The receiving opening for the workpiece is adapted to the outer contour of the workpiece. The receiving opening is designed here such that it extends from an upper face to a lower face of the workpiece.

In principle, the suction apparatus comprising the hollow-body-like housing may be designed in any form. According to a development of the invention, it is particularly advantageous for the hollow-body-like housing to be approximately disc-shaped. The housing is therefore approximately in the form of a flat hollow cylinder, with a receiving opening being made in a circumferential region.

Furthermore, according to a variant of the invention, it is advantageous for the hollow-body-like housing to comprise inlet slots in an upper portion and at least one outlet opening in a lower portion. An improved flow of air around the workpiece can be achieved by upper inlet slots, since during the suctioning not only air is drawn in from outside in the region of the receiving opening, but also brings about a targeted flow within the hollow-body-like housing from top to bottom.

A particularly good suction result can also be achieved by the suction opening of the suction apparatus being movable relative to the workpiece. Here, either the housing as a whole or a corresponding part of the housing in which the suction opening is arranged can be adjusted and moved.

Particularly good suction can also be achieved by the suction opening of the suction apparatus being designed to be annular around the deposition nozzle of the deposition apparatus and being movable therewith relative to the workpiece. The suction opening of the suction apparatus is thus readjusted to the movement of the deposition nozzle of the deposition apparatus as required.

With regard to the method, the invention is characterised in that air is supplied via the air supply in an upper region of the working space above the workpiece and air is discharged via the air discharge in a lower region of the working space below the workpiece, and in that, in addition, metal powder and/or dust close to the workpiece is suctioned away by means of at least one suction apparatus comprising at least one suction opening.

The method according to the invention can in particular be carried out by the previously described coating device. In the process, the previously described advantages can be achieved.

The invention is explained in greater detail in the following on the basis of preferred embodiments shown schematically in the drawings, in which.

Figure 1:
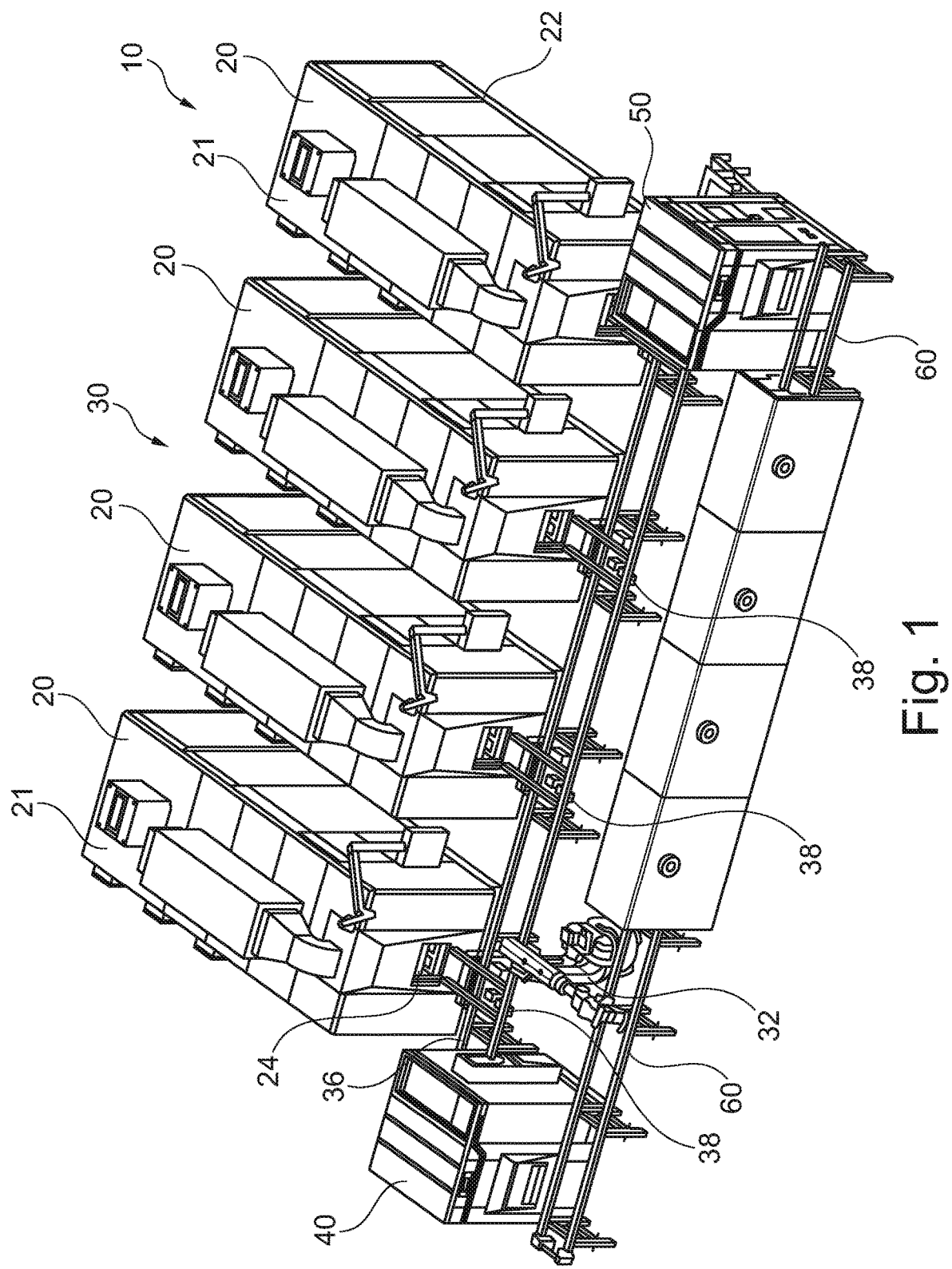
FIG. 1 is a schematic view of a system according to the invention comprising a module group.

A first embodiment of a system 10 according to the invention is shown in FIG. 1. Said system comprises four coating devices 20, which form a module group 30 in a parallel arrangement beside one another. An input measuring station 40 is arranged upstream of the module group 30, to which station workpieces (not shown here) are conveyed by means of a main conveying apparatus 60. By means of a handling apparatus 32, which is configured in the present embodiment as a multi-axis robot, the workpieces are picked up from the main conveying apparatus 60 and supplied to the box-shaped input measuring station 40.

The workpieces, in particular a surface to be coated, are measured in the input measuring station 40. In this process, a surface structure of the surface to be coated can in particular be detected, with peaks and troughs in the surface in particular being detected and measured.

The measured workpiece can then be transferred out of the input measuring station 40 via the handling apparatus 32, or directly out of the input measuring station 40, to a linear conveying apparatus 36 which runs along the coating devices 20. A supply apparatus 38 is arranged on the conveying apparatus 36, designed as a linear conveyor, upstream of each coating device 20, by means of which supply apparatus a workpiece is introduced into a working space 23 of a box-shaped housing 21 of the selected coating device 20 through an inlet opening 24.

The coating devices 20 are designed to be the same or substantially the same and comprise a transport frame 22. With this transport frame 22, the coating devices 20 can be moved and relocated by means of an indoor crane or forklift truck. This makes it possible, for example in the event of a capacity change, to add or remove additional coating devices 20 or to replace an existing coating device 20 with a new coating device 20 for repair or maintenance purposes.

In the coating device 20, at least one surface of the workpiece 5 is provided with a metal coating, as will be explained in greater detail in the following in conjunction with FIG. 2. After the coating, the workpiece 5 is guided back through the inlet opening 24 onto the conveying apparatus 36. This can also be carried out by the supply apparatus 38. By means of the conveying apparatus 36, the coated workpiece 5 is transported to a common output measuring station 50, in which the coated surface of the workpiece 5 is measured. After this final measurement in the output measuring station 50, the workpiece is placed back onto the main conveying apparatus 60, by means of which the workpiece 5 can be conveyed to further processing. The workpiece 5 can likewise be transferred from the conveying apparatus 36 into the output measuring station 50 and again to the main conveying apparatus 60 by a handling apparatus 32 in the same way as on the input measuring station 40, but this is not shown in FIG. 1.

The measured values determined in the input measuring station 40 for a specified workpiece 5 are transmitted to a central control apparatus. By means of the control apparatus, the conveying apparatus 36 is controlled by the relevant supply apparatus 38 such that the measured workpiece 5 is guided to a specified coating device 20 in the module group 30. At the same time, the measured values for the specified workpiece 5 are forwarded to the selected or specified coating device 20 by the control apparatus, such that the workpiece 5 can be coated depending on the input measured values. After the coating, the workpiece is measured in the box-shaped output measuring station 50, the determined measured values likewise being forwarded to the central control apparatus and to the data set for the specified workpiece. A comparison of the input measured values and the output measured values as well as the coating parameters can be carried out in the control apparatus in order to determine whether said workpiece has been correctly coated. If necessary, a readjustment of the operating parameters of a coating device 20 can be executed by the control apparatus during the coating.

Figure 2:
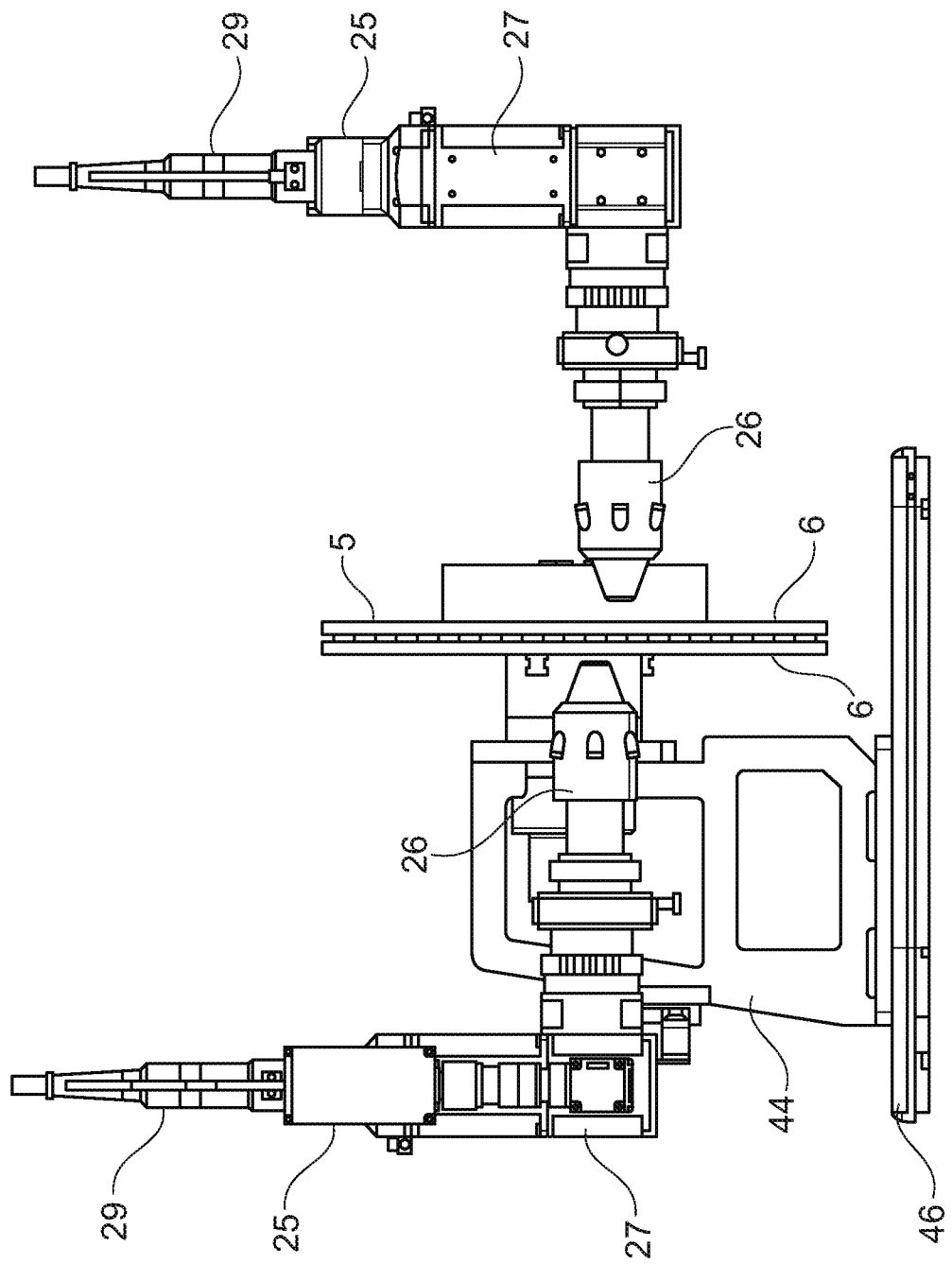
FIG. 2 is a schematic view of a first arrangement for coating a workpiece.

According to FIG. 2, a disc-shaped element can be provided as a workpiece 5 to be coated, in particular a brake disc having one or two workpiece surfaces 6 to be coated. The metal coating can be applied by a deposition nozzle 26 of a deposition apparatus 25 by means of laser deposition welding. The deposition nozzle 26 is arranged on a carrier 27. In deposition welding, coating material, in particular a metal powder, is initially applied and then locally melted by means of a laser. In the process, the coating can be carried out in multiple steps and multiple layers. In particular, the layers can also be applied with different layer thicknesses, different materials and different methods in order to achieve desired properties, in particular in terms of adhesion, abrasion resistance and/or corrosion resistance. The laser of the deposition apparatus 25 can be arranged in the region of the deposition nozzle 26.

According to the invention, it is possible to carry out the coating using two or more deposition apparatuses 25, the deposition nozzles 26 each being moved by means of a carrier 27 along the workpiece surfaces 6 to be coated by means of a movement apparatus 29, for example by linear motors. In the laser deposition welding according to FIG. 2, two deposition apparatuses 25 are arranged opposite one another, with opposite sides of a vertically arranged workpiece 5 being coated simultaneously. In the process, the workpiece 5 is rotatably retained on a transport pallet 46 on a retaining apparatus 44.

Figure 3:
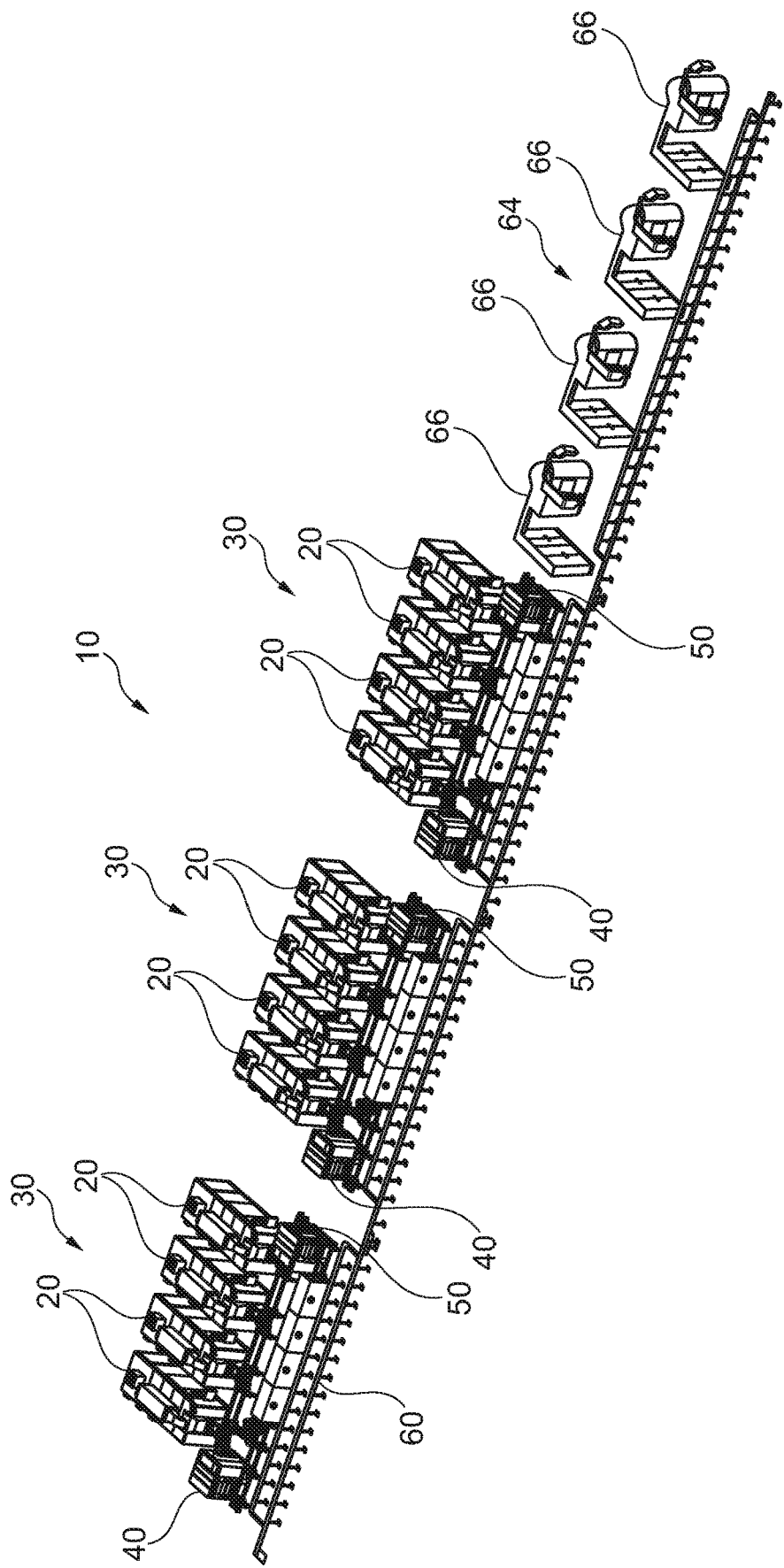
FIG. 3 is a perspective view of another system according to the invention comprising a plurality of module groups according to FIG. 1.

A development of a system 10 according to the invention comprising a total of three module groups 30, which are each made up of four coating devices 20, is shown in FIG. 3. Here, the individual module groups 30 are designed according to the embodiment in FIG. 1, with an input measuring station 40 and an output measuring station 50 being assigned in each module group 30.

The total of three module groups 30 are arranged along a linear main conveying apparatus 60, such that, in this parallel arrangement, workpieces can be processed in parallel in the individual module groups 30 and in the individual processing devices 20. After passing through the relevant output measuring station 50, a workpiece which has finished being coating is guided back to the main conveying apparatus 60, by means of which the workpiece is fed to a post-processing station 64.

In the exemplary embodiment shown according to FIG. 3, the post-processing station 64 comprises a total of four grinding devices 66 arranged in parallel. By means of the grinding devices 66, the at least one coated surface of the workpiece can be finally processed and ground. In order to ensure efficient post-processing, the detected measured values for each workpiece can be forwarded to the specified grinding device 66 in the post-processing station 64 which has been selected by the control apparatus for processing the workpiece. Depending on the detected final height of the coated surface of the workpiece, for example, the grinding tool can thus be efficiently advanced towards the workpiece in the relevant grinding device 66.

It can be seen in particular from the exemplary embodiment according to FIG. 3 that even for large increases in capacity that are potentially required, not only individual coating modules 20 but also whole module groups 30 which each comprise a plurality of coating modules 20 and associated input measuring station 40 and output measuring station 50 can be readily added to a complete system.

Figure 4:
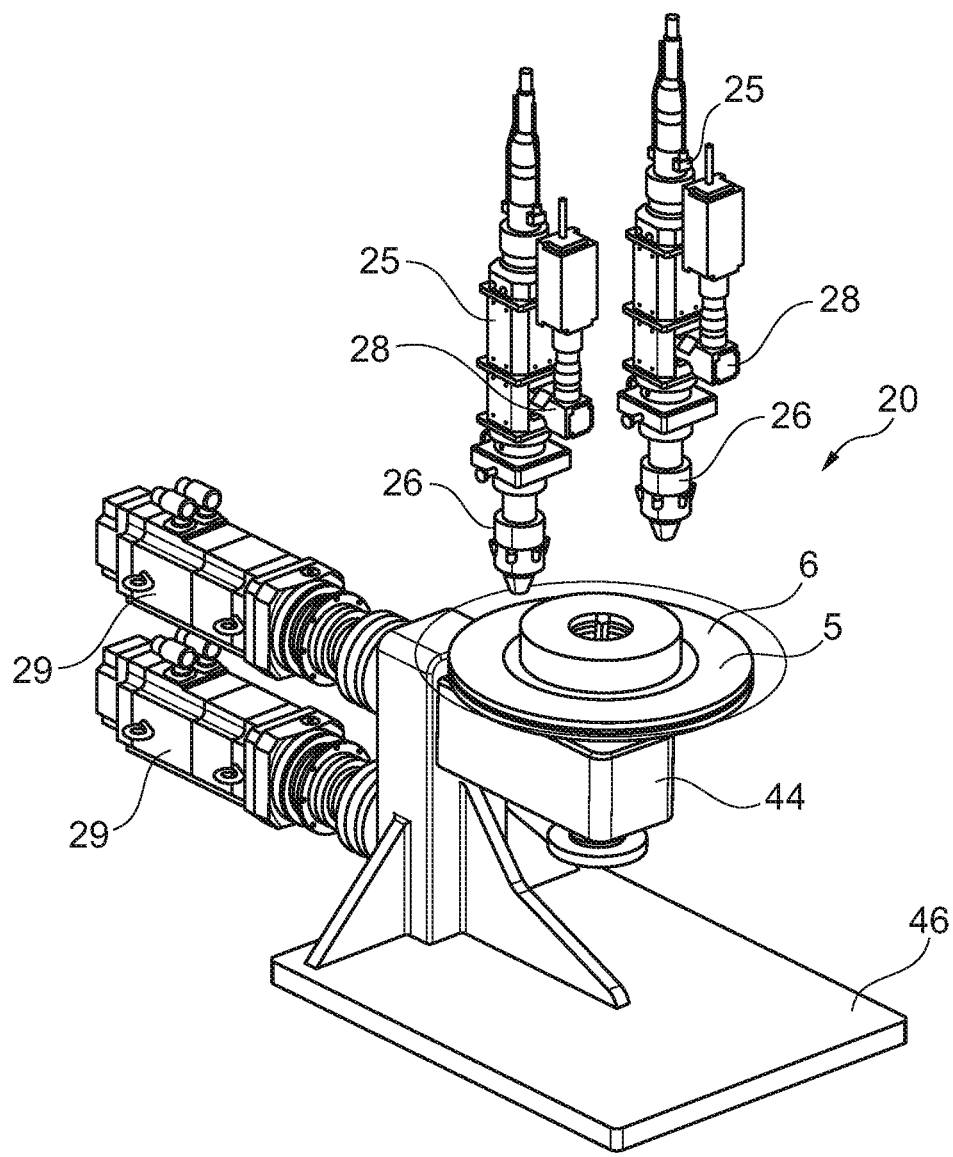
FIG. 4 is a perspective view of a second arrangement for coating.

Another coating device 20 according to the invention is shown in FIG. 4. In this coating device 20, the workpiece 5 is rotatably arranged on a transport pallet 46 on a retaining apparatus 44, such that the annular workpiece surface 6 to be coated is directed horizontally. By means of a movement apparatus 29 which in particular comprises rotary motors and linear motors, the workpiece 5 can be set into rotary movement and into radially directed linear movement on the retaining apparatus 44. Two deposition apparatuses 25 which each comprise a deposition nozzle 26 and a laser 28 are arranged above the workpiece surface 6 to be coated. The deposition apparatuses 25 can be adjusted vertically relative to the workpiece 5 and, where necessary, also in a horizontal plane. In this coating device 20, the workpiece 5 can be coated by the two deposition apparatuses 25 simultaneously.

Figure 5:
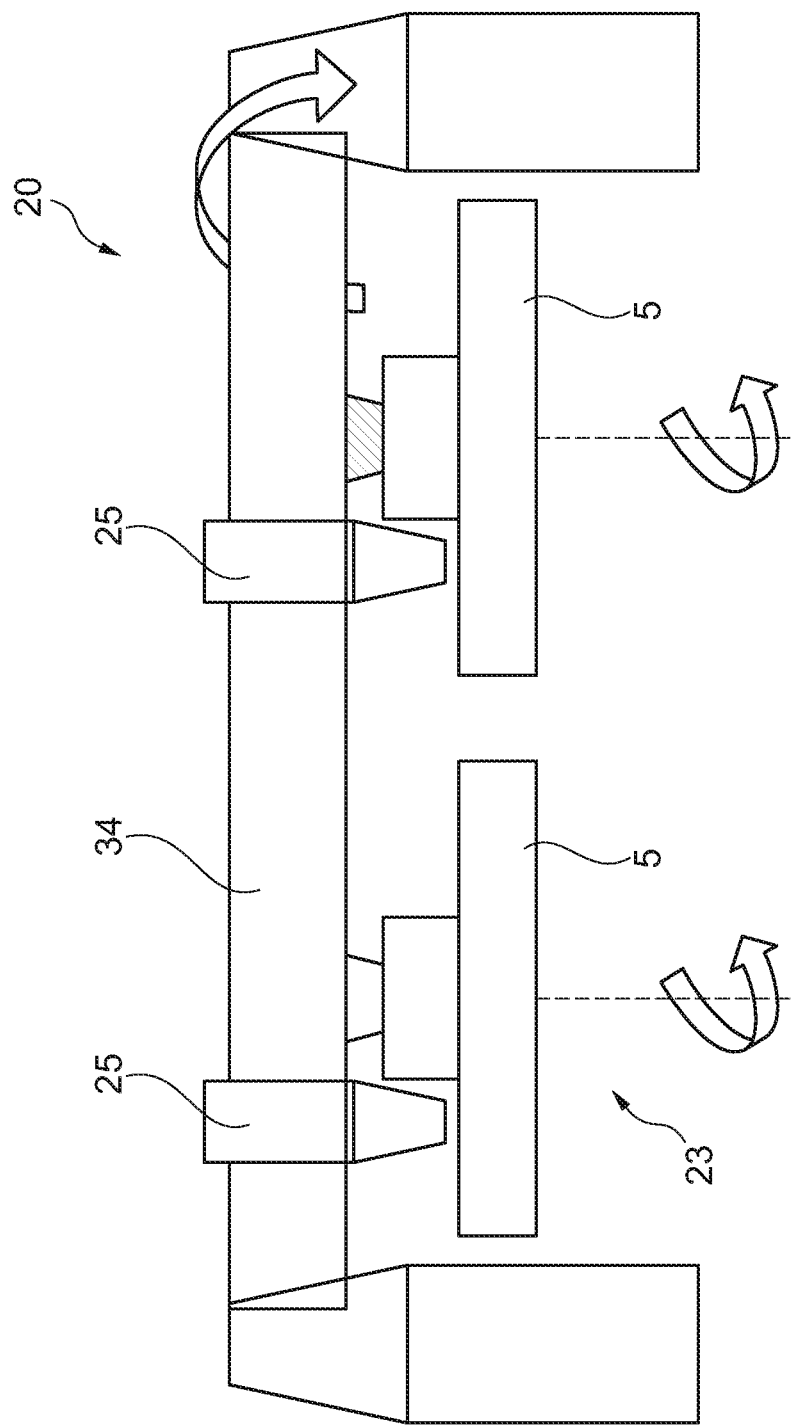
FIG. 5 is a schematic view of a third arrangement for coating.

According to FIG. 5, another variant of the arrangement of a coating device 20 according to the invention is shown. In this coating device 20, two workpieces 5 are located in a working space 23 simultaneously. In the process, the preferably rotationally symmetrical workpieces 5 are arranged so as to be rotatable about a vertical rotational axis, the rotational axes each being directed in parallel with one another. In the process, the workpieces 5 are each provided with a coating by one deposition apparatus 25. The deposition apparatuses 25 can be arranged on a common support 34, along which a linear movement of the deposition apparatuses 25 can be carried out. The support 34 may also be provided for simultaneously retaining and tensioning the workpieces 6 in the working position, with the support 34 itself being adjustable, in particular pivotable, as indicated by an arrow.

Figure 6:
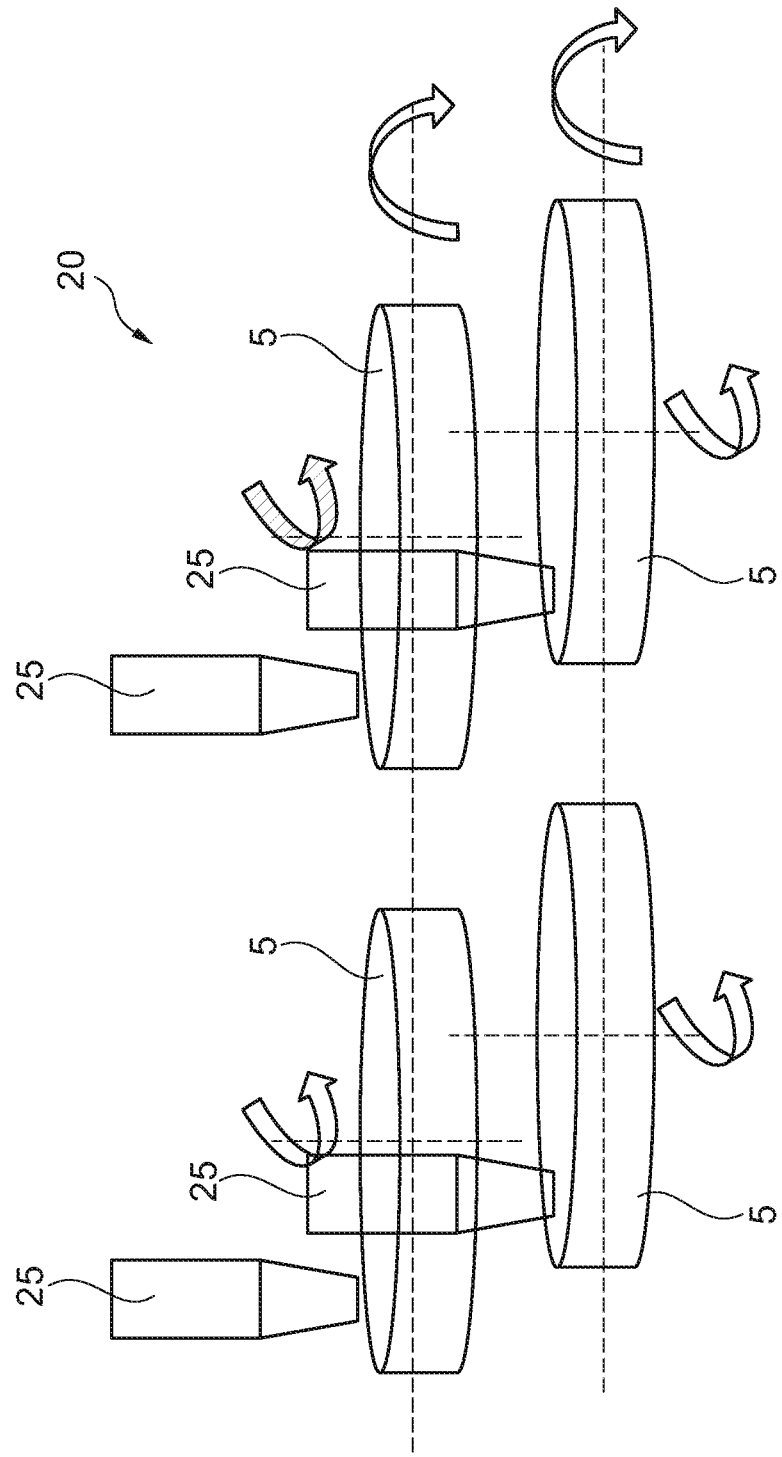
FIG. 6 is a schematic view of a fourth arrangement for coating.

According to FIG. 6, another coating device 20 according to the invention is schematically shown, in which four workpieces are simultaneously arranged in a working space of the coating device 20. Here, the workpieces 5 are each rotatably mounted about a vertical rotational axis in a horizontal arrangement so as to be directed in parallel with one another. Each workpiece 5 can be coated by means of a separate deposition apparatus 25.

In order to carry out coating on both sides, the workpieces 5 can each be pivoted about a horizontal pivot axis in a common or separate movement, such that an opposite horizontal surface of the workpiece 5 can also be coated.

Figure 7:
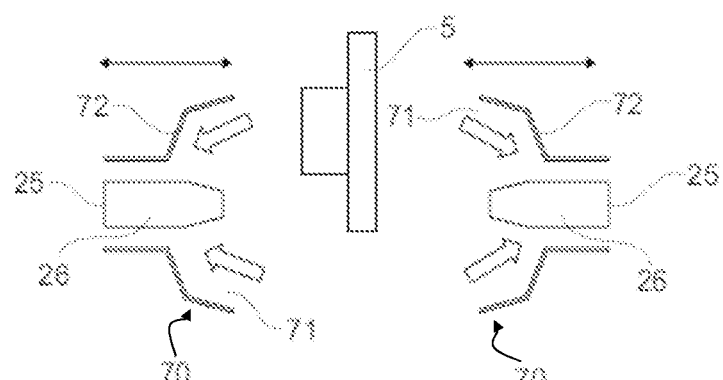
FIG. 7 is a schematic cross section of a first suction apparatus.

A coating arrangement according to the invention in FIG. 7 comprises a workpiece 5 which can be coated from two sides simultaneously by two deposition apparatuses 25 when the workpiece 5 is arranged vertically. In this case, each coating apparatus 25 comprises a deposition nozzle 26 comprising at least one laser (not shown in greater detail), the deposition nozzle 26 being coaxially surrounded by a funnel-shaped housing 72 of a suction apparatus 70. The funnel-shaped housing 72, which conically widens towards the outlet of the deposition nozzle 26, is spaced apart from the deposition nozzle 24 in radial direction, such that an annular suction channel is formed for a suction opening 71. Dust, gases or excess metal powder that develop during coating can be suctioned and conducted away from the workpiece 5 by this suction opening 71. The suction can be generated along the suction path by means of a negative-pressure generating apparatus (not shown), in particular a pump or a fan.

Figure 8:
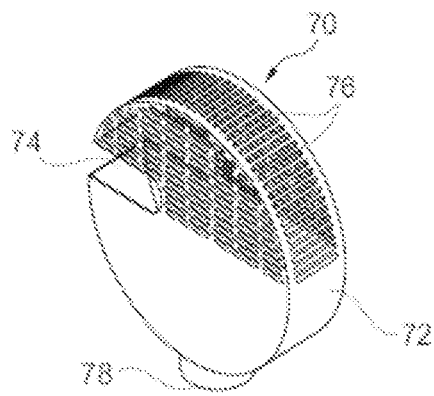
FIG. 8 is a perspective view of a housing for a second suction apparatus.

Another suction apparatus 70 is schematically shown in FIG. 8. The suction apparatus 70 comprises a hollow, disc-shaped housing 72, which comprises a slot-like receiving opening 74 on the side for attaching a workpiece 5. Elongate inlet slots 76 are made in an upper region of the hollow-chamber-like housing 72 in the front and rear wall and on the annular circumferential wall. As a result, air can enter the housing 72 from above and can flow around a workpiece arranged in the receiving opening 74 at least in part in a targeted manner in order to suction undesired dust, gases or excess material away from the workpiece.

The suctioned material can be conducted downwards through an outlet opening 78 out of the housing 72. Depending on the type of suction desired, for flow around the workpiece, solely one air flow provided in the coating device from top to bottom may be sufficient, or a negative-pressure generating apparatus may be connected in the region of the outlet opening 78 to generate an additional suction flow.

Figure 9:
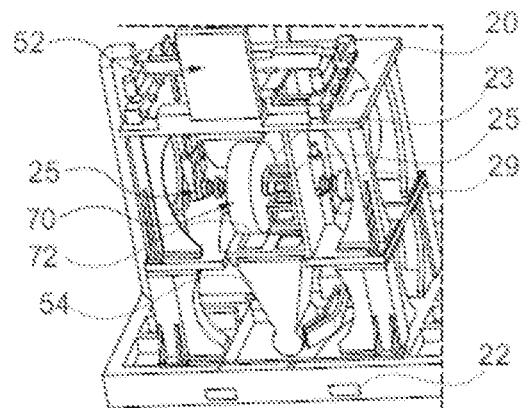
FIG. 9 is a perspective view of a coating device comprising a suction apparatus.

In the partially sectional view of a coating device 20 according to the invention in FIG. 9, a working space 23 surrounded by housing elements is provided on a transport frame 22, in which space a total of two deposition apparatuses 25 are arranged which are horizontally opposite one another.

During the coating, the workpiece is surrounded by a housing 72 of a suction apparatus 70, the housing 72 having been previously shown in greater detail in FIG. 8.

An air supply 52 in the form of a flat channel is arranged above the workpiece (not shown in greater detail here), from which air supply air flows into the working space 23 through a narrow, rectangular opening cross section approximately in parallel with the deposition apparatuses 25. A funnel-like air discharge 54 is arranged at the bottom of the working space 23, such that air can flow around the workpiece in a targeted manner and can flow through the working space 23 in a targeted manner from top to bottom. The air can thus also be used to cool the working space 23.

During the coating, a relative movement of the workpiece towards the deposition apparatuses 25 can be brought about by a movement apparatus 29, which consists of a rotary drive comprising a magnetic coupling in the embodiment shown.

The invention claimed is:

1. A coating device for metal-coating of at least one workpiece, comprising:
a housing, which surrounds a working space,
a retaining apparatus for retaining the at least one workpiece in the working space, the at least one workpiece is arranged vertically and includes first and second workpiece surfaces opposite one another,
first and second deposition apparatuses, the first deposition apparatus including a first deposition nozzle and the second deposition apparatus including a second deposition nozzle, the first and second deposition nozzles are configured to apply a metal powder to the respective first and second workpiece surfaces to be coated, and the first deposition apparatus includes a first laser and the second deposition apparatus includes a second laser for locally melting the metal powder on the respective first and second workpiece surfaces to form a coating,
at least one movement apparatus, by means of which the first and second deposition apparatuses can be moved relative to the respective first and second workpiece surfaces during the coating,
at least one air supply, and
at least one air discharge,
wherein
the at least one air supply is arranged in an upper region of the working space above the at least one workpiece and the at least one air discharge is arranged in a lower region of the working space below the at least one workpiece,
at least one suction apparatus is provided with at least one suction opening,
which is arranged adjacent to the at least one workpiece,
the first deposition apparatus and the second deposition apparatus are arranged opposite one another in the working space of the housing and are configured to simultaneously apply and melt the metal powder to the respective first and second workpiece surfaces to form the coating.

2. The coating device according to claim 1, wherein
the at least one suction apparatus comprises a hollow-body-like housing comprising a receiving opening, in which the at least one workpiece is arranged at least in part during coating.

3. The coating device according to claim 2, wherein
the hollow-body-like housing comprises inlet slots in an upper portion and at least one outlet opening in a lower portion.

4. The coating device according to claim 3, wherein
the hollow-body-like housing is approximately disc-shaped.

5. The coating device according to claim 1, wherein
the at least one suction opening of the suction apparatus can be moved relative to the at least one workpiece.

6. The coating device according to claim 1, wherein
the at least one suction opening of the suction apparatus is designed to be annular around the first and second deposition nozzles of the first and second deposition apparatuses, respectively, and can be moved therewith relative to the at least one workpiece.

7. A method for metal-coating of at least one workpiece with a coating device including a housing which surrounds a working space, the method comprising:
retaining the at least one workpiece in the housing in the working space by means of a retaining apparatus, the at least one workpiece is arranged vertically and includes first and second workpiece surfaces opposite one another,
coating the respective first and second workpiece surfaces of the at least one workpiece by means of first and second deposition apparatuses, the first deposition apparatus includes a first deposition nozzle and the second deposition apparatus includes a second deposition nozzle for applying a metal powder to the respective first and second workpiece surfaces to be coated, and the first deposition apparatus includes a first laser and the second deposition apparatus includes a second laser for locally melting the metal powder on the respective first and second workpiece surfaces to form a coating,
moving the first and second deposition apparatuses relative to the respective first and second workpiece surfaces during coating by means of at least one movement apparatus, and
supplying air into the working space via at least one air supply and discharging the air from the working space via at least one air discharge, wherein
the air is supplied via the at least one air supply in an upper region of the working space above the at least one workpiece and the air is discharged via the at least one air discharge in a lower region of the working space below the at least one workpiece,
the metal powder and/or dust adjacent to the at least one workpiece is suctioned away by means of at least one suction apparatus comprising at least one suction opening,
the first deposition apparatus and the second deposition apparatus are arranged opposite one another in the working space of the housing and are configured to simultaneously apply and melt the metal powder to the respective first and second workpiece surfaces to form the coating.

\* \* \* \* \*